US006193501B1

United States Patent
Masel et al.

(10) Patent No.: US 6,193,501 B1
(45) Date of Patent: Feb. 27, 2001

(54) MICROCOMBUSTOR HAVING SUBMILLIMETER CRITICAL DIMENSIONS

(75) Inventors: Richard I. Masel; Mark A. Shannon, both of Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/348,619

(22) Filed: Jul. 6, 1999

(51) Int. Cl.$^7$ ................................................. F23D 21/00

(52) U.S. Cl. ..................... 431/170; 431/268; 431/328; 422/177; 422/191; 502/527.23

(58) Field of Search ................................ 431/268, 7, 350, 431/170, 328, 327, 326; 126/204, 208, 407, 404, 401, 413, 92 AC; 422/177, 180, 191; 502/527.23; 60/723, 39.35, 39.36

(56) References Cited

U.S. PATENT DOCUMENTS

| 4,916,904 | * | 4/1990 | Ramsaier et al. ..................... 431/268 |
| 5,403,184 | * | 4/1995 | Hosaka et al. ........................ 431/268 |
| 5,932,940 | * | 8/1999 | Epstein et al. ....................... 60/39.35 |

FOREIGN PATENT DOCUMENTS

43737   * 12/1979 (JP) ...................................... 431/268

OTHER PUBLICATIONS

A. Mehra, I.A. Waitz, "Development of a Hydrogen Combustor for a Microfabricated Gas Turbine Engine", presented at Solid–State Sensor and Actuator Workshop, Hilton Head Island, South Carolina, Jun. 8–11, 1998.
R.I. Masel, "Principles of Adsorption and Reaction on Solid Surfaces", J. Wiley & Sons, New York, 1996, pp. 361–370.
S. Kondo, S. Horiguchi, M. Iwasaka, K. Tokuhashi, H. Nagai, "Effect of Pressure and Oxygen Concentration on Quenching Distances of Flammable Gases", Nippon Kagaku Kaishi 7, 1992, pp. 788–792.
S. Ono, Y. Wakuri, "An Experimental Study on the Quenching of Flame by Narrow Cylindrical Passage", *Bulletin of the JSME*, vol. 20, No. 147, Sep. 1977, pp. 1191–1198.
J.R. Price, M. Van Roode, "Corrosion resistant Coatings for Silicon Carbide Heat Exchanger Tubes", *Ceramic Thin and Thick Films*, V. Basavaraj, Ed. American Ceramic Society, Westerville, OH, pp. 169–188 (1990).
H. Davy, *Philosophical Transactions of the Royal Society of London*, 1817, pp. 45–85.
Y. Kadioglu, H. Sehitoglu, "Thermomechanical and Isothermal Fatigue Behavior of Bare and Coated Superalloys", *ASME Journal of Engineering for Materials and Technology*, vol. 118, Jan. 1996, pp. 94–102.
H. Sehitoglu, "Thermal and Thermomechanical Fatigue of Structural Alloys", *ASM Handbook on Fatigue and Fracture*, vol. 19, pp. 527–556.
O.M. Akselsen, "Review–Diffusion Bonding of Ceramics", *Journal of Material Science*, vol. 27, 1992, pp. 569–579.
M.G. Nicholas, R.M. Crispin, "Diffusion Bonding Ceramics with Ductile Interlayers", *Science of Ceramics*, vol. 14, 1988, pp. 539–544.

(List continued on next page.)

Primary Examiner—James C. Yeung
(74) Attorney, Agent, or Firm—Greer, Burns & Crain, Ltd.

(57) ABSTRACT

A microcombustor which is submillimetric in critical dimensions. The invention relies upon solving quenching at submillimetric dimensions. Chemical and thermal quenching are inhibited by selection of materials having a low well depth below approximately 40 kCal/mole. This allows formation of a microcombustor having submillimetric combustion chamber. A preferred microcombustor is formed in a substrate structure. The preferred microcombustor includes a wafer stack of at least three wafers, a central wafer housing a combustion chamber. At least one inlet and outlet are included for the insertion of reactants and exhaust of a flame.

16 Claims, 4 Drawing Sheets

OTHER PUBLICATIONS

M.A. Shannon, R.I. Masel, slide presentation entitled "Power Generation Based on Microscale Combustion", given on Jul. 8, 1999, at a Principle Investigators meeting for the DARPA ETO program.

M.A. Shannmon, R.I. Masel, slide presentation entitled "Micro–Engines Based on Combustion at the Micro–Scale", given on Jan. 15, 1999, at a Principle Investigators meeting for the DARPA ETO program in Baton Rouge, LA.

* cited by examiner

MICROCOMBUSTOR HAVING SUBMILLIMETER CRITICAL DIMENSIONS

FIELD OF THE INVENTION

This invention generally concerns the field of micro-scale power sources. More specifically, the invention concerns a microcombuster having a submillimeter combustion chamber which will neither thermally quench a flame nor chemically quench a flame, so that spontaneous internal combustion can be sustained.

BACKGROUND OF THE INVENTION

The quenching effect of submillimetric spaces has been known and used for many years. Sir Humphrey Davy patented the explosion proof lamp in 1812. He showed with his invention that combustion was completely quenched if a flame had to pass through a mesh of sub-millimeter critical dimensions. Other scientists throughout the 1800's and early 1900's separately proposed mechanisms and experimental verification that combustion is quenched within millimeters of surfaces. At that time, this was an important discovery since it allowed for safety mechanisms on lamps and other devices used by miners. By forcing a flame to come into contact with a sub-millimeter hole, the flame would be quenched and large explosions could be avoided. This same concept is used extensively in flame arresters today.

Recently scientists have become interested in microcombustion as a compact and efficient power source. It is recognized that so-called microcombustors would be especially useful in operating microelectromechanical systems, or MEMS. MEMS have wide ranging potential use in various fields such as military sensing operations and medical devices.

To date, batteries have been the mainstays for supplying power for micro-scale systems and MEMS devices. These battery packs, however, are much larger than the microelectronics and communication packages combined. Also, the battery is inefficient, in that it must be recharged frequently. Therefore, there is a need for alternative, low-cost methods of generating continuous power sources for MEMS.

Any number of other devices would similarly benefit from a microcombustion power source. Since combustion produces the highest power per unit of weight of volume of all methods of generating and supplying power excepting nuclear energy, it has become an identified source as a potential replacement for batteries, typically used in any number of portable devices, e.g., computers, cell phones, flashlights. Also, microcombustors can be used for heat sources for micro-to miniature chemical reactors, and for micro-to miniature internal and external combustion engines. However, as discussed above, it is well known that combustion does not occur on the sub-millimeter level due to the quenching of the flame. Therefore, researchers have been impeded by their inability to sustain combustion at submillimetric dimensions.

Therefore, there is a need for a microcombuster which is submillimetric in critical dimension. Also, there is a need for a microcombustor which is self-sustaining so it can be used for long periods of time without need of recharging.

Accordingly, it is an object of the present invention to provide a new and improved microcombustor which sustains combustion at submillimetric dimensions.

Another object of the present invention is to provide an improved microcombustor which can propagate a flame through a hole with a diameter which is submillimetric.

Another object of the present invention is to provide a new and improved microcombustor which is self-sustaining and can provide power for long periods of time without recharging.

SUMMARY OF THE INVENTION

These and other needs are met or exceeded by the present microcombuster. Basically, the invention prevents quenching at submillimetric dimensions to enable self-sustained combustion on a microscale. The invention utilizes a combustor that is sub-millimetric in critical dimensions, which are determined by the distance the wall acts on the gases above the surface, and houses a combustion chamber. The walls have chemical characteristics which prevent chemical quenching of the flame at the walls. In a preferred embodiment, the combustion chamber utilizes catalysts to get the reactants hot, ignited and burning. Reactants are introduced into the combustion chamber through inlets. The preferred chamber further utilizes a structure and design which allow the walls to become heated along with the reactants. Since the walls stay hot, thermal quenching of a flame that was created can be avoided.

DETAILED DESCRIPTION OF THE DRAWINGS

The present invention provides a microcombustor for use as a power source. The microcombustor is sub-millimetric in critical dimensions. Namely, it utilizes a submillimetric combustion chamber. Reactants are input into the combustion chamber through inlets. In a preferred embodiment, the combustion chamber then utilizes catalysts to get the reactants hot, ignited and burning. The chamber is constructed such that the walls become heated along with the reactants. Since the walls stay hot, thermal quenching of a flame that was created can be avoided. Chamber walls have surfaces formed from materials with low well depths to prevent chemical quenching of the flame as well. The result is a self-sustaining combustion at submillimetric dimensions. This, as artisans will appreciate, enables construction of very small power sources.

Figure 1:
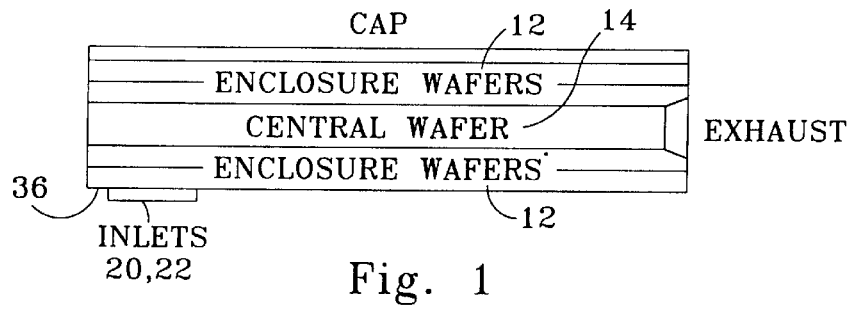
FIG. 1 is a schematic side view of a microcombustor.

FIG. 1 depicts a schematic side view of a microcombustor 10. In the preferred embodiment, the microcombustor 10 includes at least three wafers, two enclosure wafers 12, and a central wafer 14. The central wafer 14 houses the combustion chamber 16 (shown in FIG. 2) with the enclosure wafers 12 providing thermal isolation for the central wafer 14. The enclosure wafers 12 will also provide routing for a reactant and product fluid flows. In the preferred embodiment wafers were used. However, other substrates are also contemplated.

Channels and hollows may be formed in the wafers through conventional microfabrication techniques. For example, diamond machining of a silicon carbide and electron beam evaporation are used. Many types of standard removal methods, such as wet and dry etching can be used to create combustion chambers.

Figure 2:
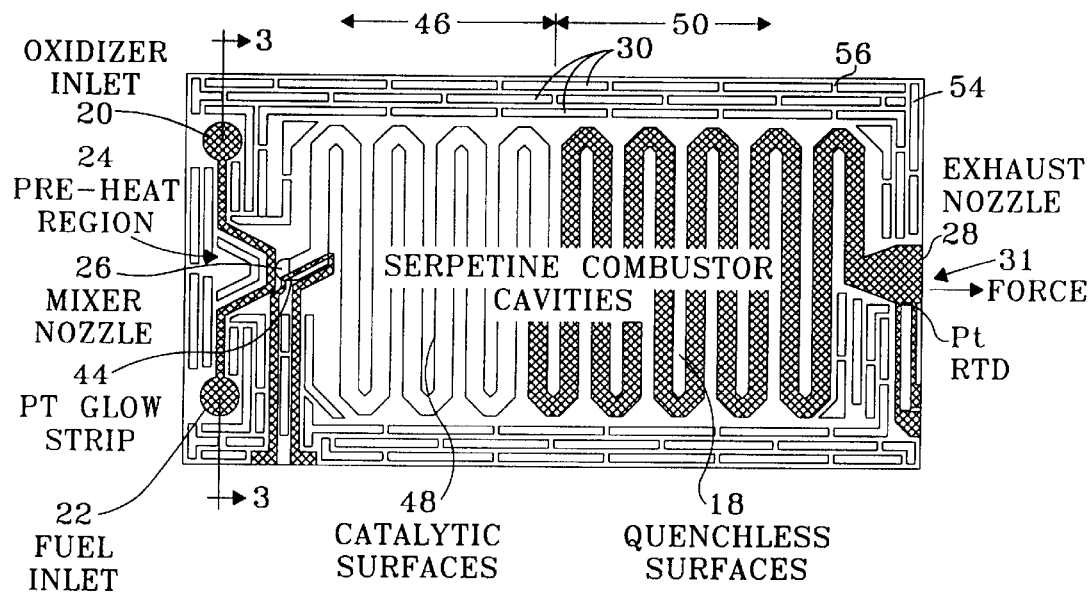
FIG. 2 is a schematic view of a central wafer of a microcombustor.

Turning now to FIG. 2, a schematic of the inside of the central wafer 14 is shown. The central wafer 14 includes the combustion chamber 16 formed by walls 18. Once commenced and supplied with fuel, combustion will sustain in the chamber despite its submillimetric dimensions due to properties of the surfaces of walls 18. Oxygen is supplied through oxidizer inlet 20 and fuel through a fuel inlet 22 to provide the combustion reactants. A preheat section 24 heats oxygen and fuel before they are mixed by a mixer nozzle 26. An exhaust nozzle 28 dispels combustion exhaust. A plurality of side thermal isolation cavities 30 provide a thermal barrier to outside environment. The thermal barriers are important in this application because loss of too much heat makes the microcombustor 10 have a low efficiency Maintaining a high temperature at the surface of walls 18 is important. A power outlet 31 directs force from combustion outward from the combustion chamber. The dispelled force may be converted to useful energy by any suitable means. For example, it might directly move a macro or micromechanical structure. It might turn a macro or micromechanical turbine for generation of electrical energy.

Artisans will therefore appreciate applicability of the microcombustion 10 as a power source for MEMS. Artisans will also appreciate that one or more microcombustions could serve to power any number of other small and large devices. Arrays of microcombustors would multiply power in much the same way that adding cylinders can increase power in a conventional combustion engine.

For combustion in the chamber 16 to occur and be sustained, it is necessary to overcome both thermal quenching and chemical quenching of the flame. Thermal quenching is the loss of energy generated by combustion through heat transfer out of the combustion region. With submillimetric dimensions, the high surface area to volume ratios encourage thermal quenching, which must be overcome. To prevent such thermal quenching, the material forming the wall surfaces 18 must be able to endure and sustain high temperatures. The material must minimize heat loss, so the walls 18 do not remove heat from the combustion chamber 16. Therefore, the material chosen must be able to withstand sustained temperatures greater than the ignition temperature, which is greater than 400° C. in the preferred embodiment. In the preferred embodiment, Silicon Carbon is used for the wall material since it can endure and sustain high temperatures. Other materials which minimize heat transfer and can withstand such sustained temperatures will also be suitable.

We have also determined that chemical quenching is a barrier to combustion at submillimetric dimensions. Chemical quenching occurs when the reactive species is removed by reaction with the material forming the combustion chamber wall surfaces. For chemical quenching to be overcome, the material chosen for the walls 18 must have a low well depth. Low well depth is defined as the heat of absorption of radicals on surfaces. The heat of absorption is the energy required by molecules to adhere to other materials. As the well depth approaches zero, the probability of a radical being trapped is lessened, and chemical quenching is decreased. In the preferred embodiment, the well depth is less than 40 kCal/mole. Preferred material characteristics for device longevity and reliability include resistance to corrosion and decomposition, good tensile strength, high creep resistance, good resistance to thermal shock, low thermal expansion mismatch, ability to form bonds with high strength and low residual stresses, low thermal conductivity, opacity, low vapor pressure, and low permeability to gases and liquid. Although no presently known single material has all these attributes, materials can be combined to achieve most of them.

In the preferred embodiment, a coating which exhibits at least the low well depth characteristic is applied to SiC, which has favorable thermal and mechanical qualities.

Material resistance to corrosion and decomposition during combustion is essential for long term operation of the combustor. A material which is easily etched or oxidized by hot water vapor combined with oxygen should not be used directly to form chamber walls 18. However, use of such a material with a suitable coating is contemplated. Such a coating should also be resistant to corrosion and decomposition. Also, there should not be thermal mismatch between the coating and the underlying material, since additional cracking and oxidation would be the result. The coating should be able to resist the oxidation for long periods of time. If the coating does not, micro-cracks can oxidize and expand to lead to further cracking and greater oxidation to greatly reduce useful life of the microcombustor 10.

Also important is good intrinsic creep strength, or resistance to creep. Creep occurs when materials are under stress and thermal mobility allows individual atoms to move. This alleviates some of the stress on the object. However, it is harmful because it can lead to a change in shape. The material chosen for walls 18 should also have high tensile strength. High tensile strength is the resistance of the material to rupture under tension. Therefore, it is desirable to have a material which does not change shape or rupture under stress or tension to form the combustion chamber 16.

Another important factor is the wall 18 material's resistance to thermal stresses. Thermal stresses can cause failure due to transient thermal shock, steady-state thermal stresses due to high temperature gradients, mismatch in thermal expansion between materials with different coefficients of thermal expansion, CTE, and residual stresses across bonds. CTE gives the amount per unit length that a material expands with increasing temperature. The very nature of a microcombustor implies that high thermal gradients can exist, since the preferred embodiment microcombustor 10 starts from a high combustion temperature and the outer surfaces may be required to end at room temperature in a very small distance. Thermal isolation of the combustion cavity to achieve sustainable burning further increases the overall temperature drop imposed on the structure. The materials to form the microcombuster 10 structure should be chosen to help minimize thermal stresses to prevent such failures.

Another important issue is the bond strength between the enclosed wafers 12 and the central wafer 14. A bonding material should be chosen which can create strong high-temperature bonds with the chosen material and has a similar CTE to the materials it is bonding. Also important is the feasibility of bonding the bonding material to the wafer or substrate material. The bonding is preferably a relatively easy process, such as applying amorphous precursors of the bonding material to the wafer or substrate material and converting the bonding material to crystalline form while simultaneously bonding the two materials.

In the preferred embodiment, suitable surface materials to prevent chemical quenching on walls 18 are chosen using the Masel-Weinberg-Merrill approximation for radical trapping probabilities:

$$P_{trap} = 1 - \frac{(1 + m_g/m_s)^2 (2kT_g)}{2.4(m_g/m_s)\{2k(T_g - T_s) + w\}}$$

where $T_g$=gas temperature, $T_S$=surface temperature and w=well depth. To improve chemical quenching conditions, the well depth of the coating should be made as low as possible.

In tests conducted, Silicon Carbon, SiC, has been used for the wall material due to its low well depth, high tensile strength and creep resistance. SiC is especially attractive because its strength is very high and actually increases with temperature. However, SiC has its drawbacks as a material. SiC has a propensity for eroding in flames, has difficulty forming bonds between the wafers and it has a relatively high thermal conductivity, which can increase thermal quenching. Solutions exist for all of these problems. First, a dense phase mullite ($SiO_2+Al_2O_3$) works well as the bonding material and also as a material to use as the wall surface coating. Mullite helps the microcombustor 10 be resistant to corrosion and also easily forms bonds between the enclosure wafers 12 and the central wafer 14. Second, by utilizing thermal breaks 30 as shown in FIG. 2, the effective thermal conductivity can be dramatically decreased. Although these materials are used in the preferred embodiment, other materials that embody the principles discussed above may be used. The preferred materials have been demonstrated to permit a flame to travel through a 100 micron diameter elongate channel.

Other coatings are also contemplated compounds from the silica and alumina families work and the alumina and magnesia families. Zirconia and related families, such as yitterium stabilized zirconia, and halfium stabilized are also contemplated. Problems with each of these materials can be overcome by engineering films that have low well depth and also meet the other restraints.

The coating can be fabricated in numerous ways. Several standard deposition methods, such as evaporation, sputtering, and chemical vapor deposition can be used for coating the walls. Bonding the substrates can be accomplished by using thin amorphous layers of silica and alumina on the substrates and firing at 1550° C. for two hours.

Figure 3:
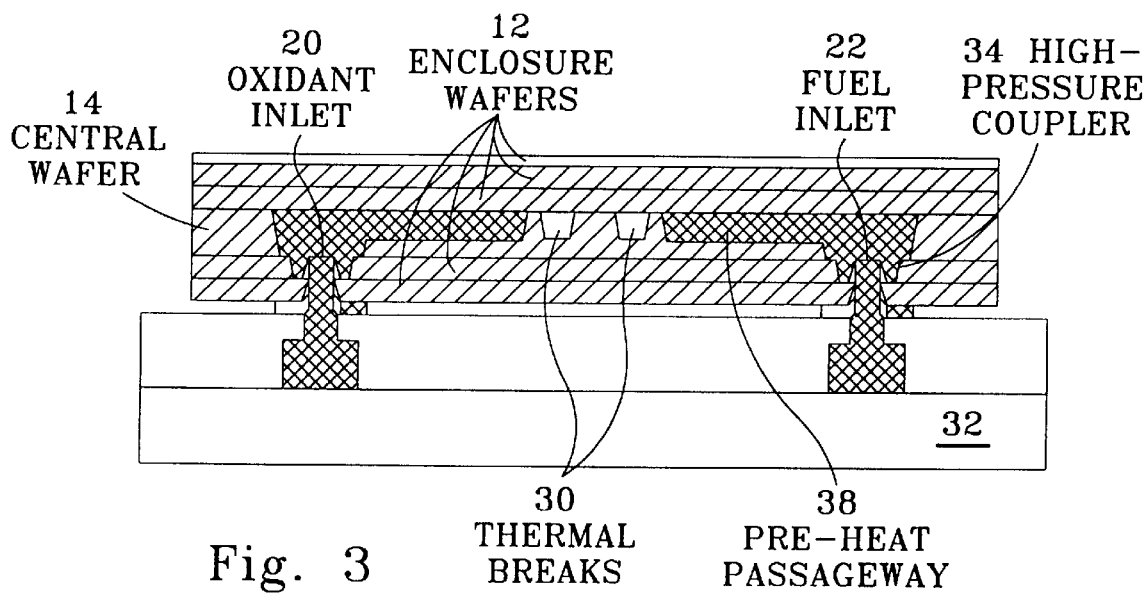
FIG. 3 is a end view of the wafer stack taken through the line AA shown in FIG. 2.

Referring again to FIG. 2, the oxidizer and fuel inlets 20, 22 provide entrances for the oxidant and fuel streams. These inlets 20,22 are etched through the wafer stack 12, 14. Shown in FIG. 3 is the access of the inlets 20, 22 from a cold system substrate 32, i.e., a component in a device into which the microcombustor 10 is incorporated.

High-pressure connections must be achieved between the inlets 20, 22 and the cold substrate 32. One way is to bond the microcombustor 10 and the cold substrate 32 in a limited region surrounding the inlets 20, 22 in both pieces. Another way is to use micro-molded metal inserts 34 which are plated on the cold substrate, and which penetrate through a tapered etch hole into a recess in the inlet 20, 22. The insert 34 is bonded to the microcombustor with an oven brazing type process.

Turning again to FIG. 2, the fuel and oxidant must be raised in temperature from the ambient to the initiation temperature. Therefore, the preheat section 24 must be designed to raise the temperatures. The inlets 20, 22 are thermally isolated from the high combustion temperatures, and are thermally connected to an outer surface 36 (see FIG. 1) of the microcombustor 10. A plurality of passageways 38 forming preheat region 24 lead from the inlets 20, 22 to the mixer nozzle 26 and are progressively less thermally insulated from the combustion temperatures, thereby raising the vapor temperatures of the fuel and oxidant before the mixer nozzle 26.

After the fuel and oxidant travels through the preheat section 24, they reach the mixer nozzle 26. In one embodiment, the mixer nozzle 26 is designed to speed the fluid up through restriction at the entrance to an enlarged mixer cavity 40. The fuel and oxidant flows are designed to be impinging on each other, to help mix the fluids directly through shear which is a stress imposed by stretching one side of the stream more than the other, and to increase the relative velocities with respect to each other. In addition to the higher flow velocities, the enlarged mixer cavity 40 creates a transient high Reynolds number to induce transition to turbulence to enhance mixing. Complete mixing will occur in a catalytic combustion region 42 of the microcombustor 10. Also contemplated is a device without a mixer cavity where the fuel and oxidant mix through diffusion in the chamber.

To begin the combustion reaction from a cold start, a strip of Platinum, Pt, 44 which is evaporated on a top surface of a mixer nozzle 26, acts as an ignitor. By passing electrical current to the Pt strip 44, the mixed vapor of fuel and oxidizer is heated, initiating the oxidation reaction to begin before the vapor enters the catalytic combustion region 42 of the microcombustor 10. Once up to operating temperature, the electrical current to the Pt strip 44 is turned off. Diffusion of heat from the combustor is sufficient to initiate the oxidation reaction.

Another critical issue in microcombustion is the relatively long residency time required for complete combustion. Due to the long residency time, the combustion chamber may be long. However, lengthening the combustion chamber enlarges the size of the microcombustor as a whole, which may be problematic in certain applications. To achieve the required residence time, while keeping overall device size small, the combustion chamber 16 is preferably serpentine in shape. Changing the length of a section can accommodate the residency time for various fuels and oxidants. An added feature is that the temperature of an inner surface 18a of the walls 18 will minimize heat transfer since the temperature of the reacting flows are hot and relatively unchanging, with respect to the ambient temperature. Other elongate shapes are also suitable.

The microcombustor 10 is designed to have at least one, possibly two sections. In the preferred embodiment, the catalytic combustion region 42 employs a plurality of catalytic surfaces 48. The first section 46 utilizes the catalytic surfaces 46 to increase the temperature of the fuels and oxidants to the desired ignition temperature. In the preferred embodiment, a second section 50 includes walls 18 coated with the quenchless materials discussed earlier. Embodiments without catalytic sections are contemplated, such as shown in FIGS. 5A and 5B.

Figure 4:
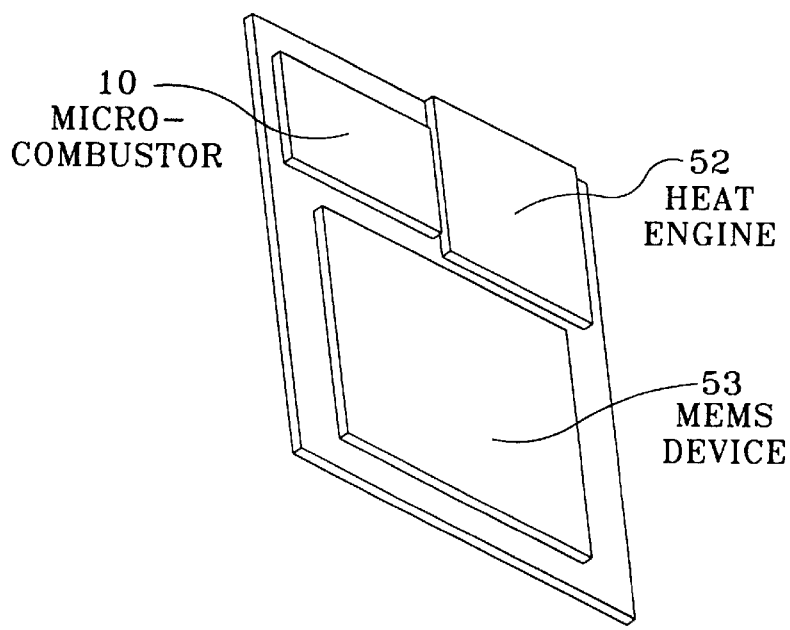
FIG. 4 is a schematic of a microcombustor, engine and MEMS.

Next, the exhaust nozzle 28 design is determined by pressure required within the microcombustor 10 and the temperature required for output to a heat engine 52 (shown along with a MEMS 53 in FIG. 4). The expansion of the nozzle 28 is determined by the temperature and velocity required for the exiting exhaust gases. If only photo and thermal electric power is extracted from the microcombustor 10, then the exhaust gases must be rapidly cooled. A rapid expansion nozzle 28 will cool the gases and increase the velocity of the gases. Temperatures can then be reduced to near ambient temperatures. However, significant condensation is expected which must be removed. One of method of removal is capillary wicking, although other methods are contemplated. If power is obtained from the exhaust force, then exhaust is expelled directly and the exhaust nozzle 28 need not be an expansion nozzle. Handling the exhaust in such a manner is only necessary for certain applications. For microcombustors used as a heater, or other systems, handling the exhaust is not required.

Side thermal isolation cavities 30 surround the combustion chamber 16 to thermally isolate the chamber 16 from the ambient temperature. This also helps the walls 18 of the combustion chamber 16 to stay hot and avoid loss of heat. The isolation cavities 30 consist of a series of reflectors 54 to reflect the heat back into the walls 18 of the combustion chamber 16 and vacuum breaks 56 to isolate the combustion chamber 16 from the air outside the microcombustor 10.

Figure 5A:
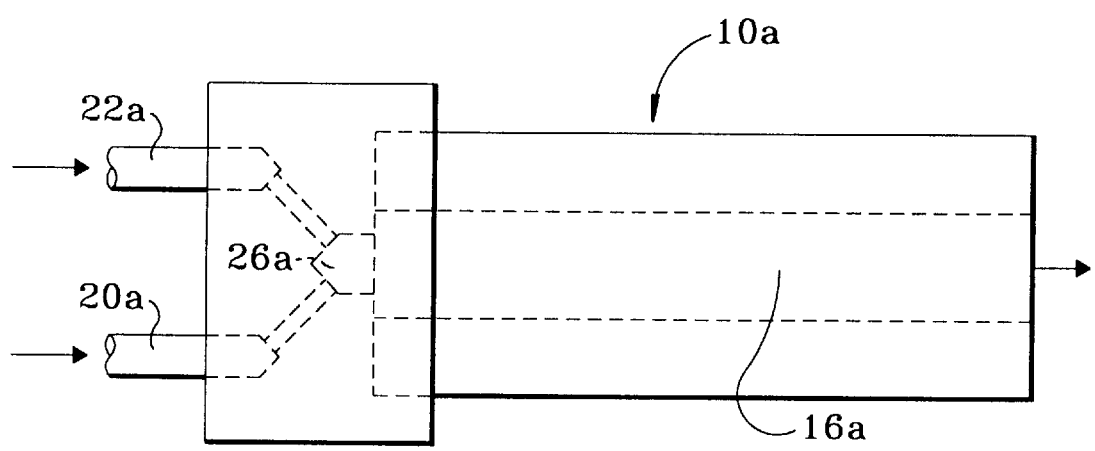
FIG. 5A is a schematic top view of a microcombustor according to a second embodiment.
Figure 5B:
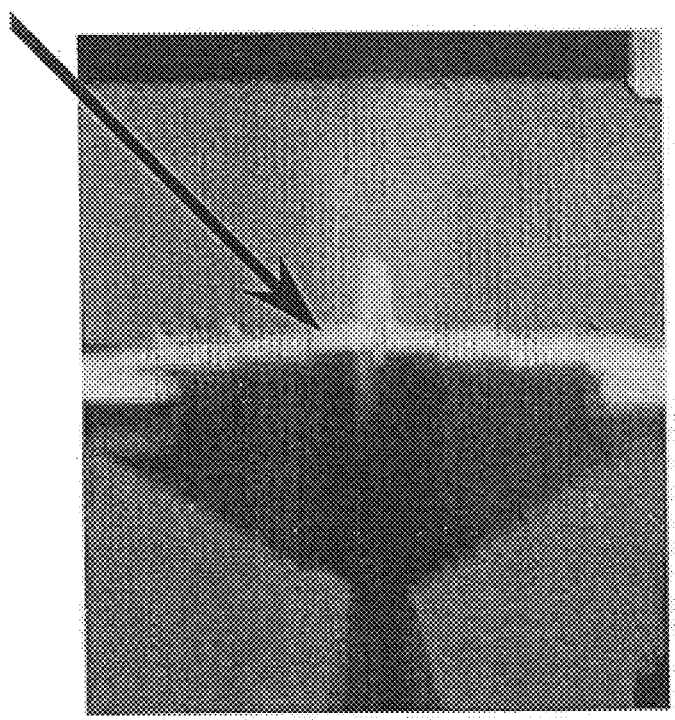
FIG. 5B is a photograph of the microcombustor of the second embodiment propagating a flame.

Turning now to FIG. 5A, a top view of another embodiment is shown. A microcombustion 10a is shown that has a fuel inlet 22a, an oxidine inlet 20a, and a mixing system 26a. The mixed fuel and oxidizer then enter a straight combustion chamber 16a that is coated with quenchless coatings. The exhaust exits out of an exhaust outlet 28a. In this embodiment, thermal isolation is not required. This embodiment can be used, for example, for heater applications which would utilize hot external surfaces.

Shown in FIG. 5B, is a prototype of the combustion chamber 16a at work. A flame is shown propagating through a 100 micron diameter hole. This propagation down to 100 micron diameter has been achieved for a straight combustion chamber 16a, as shown in the FIG. 5A device.

The resulting microcombustor is sub-millimeter in critical dimensions, yet still able to propagate a flame. Since the microcombustor behaves as a combustor, flames can be propagated and sustained for long periods of time, thereby reducing the need for frequent recharging.

The many advantages of this invention are now apparent. First, a microcombustor has been created that is submillimetric in size. Due to the materials used to design the combustion chamber, such as the wall surface materials, thermal and chemical quenching is avoided. Thus, propagation of a flame through a hole with a sub-millimetric diameter occurs with the present device. Since the dimensions of the microcombustor are so small, the size of many devices which currently use battery power can be greatly reduced. Also, due to the nature of combustion power, the power can be supplied for much longer periods of time before recharging is needed.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A microcombustor comprising:
an elongate combustion chamber having submillimetric critical dimensions;
means for inputting combustion fuel into said combustion chamber;
a coating on inside surfaces of said combustion chamber, said coating having a low well-depth to inhibit chemical quenching; and
an exhaust from said combustion chamber.

2. The microcombustor as claimed in claim 1, wherein said combustion chamber is formed in a substrate.

3. The microcombustor as claimed in claim 2, wherein said substrate is a wafer formed of SiC.

4. The microcombustor as claimed in claim 1, further comprising a preheat section for preheating said fuel before it enters said combustion chamber.

5. The microcombustor as claimed in claim 1, wherein said combustion chamber forms a serpentine path.

6. The microcombustor as claimed in claim 2, wherein at least one of said substrate and said coating is resistant to corrosion and decomposition at high temperatures.

7. The microcombustor as claimed in claim 2, wherein at least one of said substrate and said coating has tensile strength at high temperatures.

8. The microcombustor as claimed in claim 2, wherein at least one of said substrate and said coating is creep resistant.

9. The microcombustor as claimed in claim 2, wherein at least one of said substrate and said coating is resistant to failure due to thermal stresses.

10. The microcombustor as claimed in claim 1, wherein said coating comprises $SiO_2+Al_2O_2$(mullite).

11. The microcombustor as claimed in claim 1, wherein said combustion chamber is formed in a wafer and said microcombustor further comprises at least two enclosure wafers for thermally isolating said combustion chamber.

12. A microcombustor comprising:
a central wafer having an elongate channel formed therein, said channel having a submillimetric diameter;
at least two enclosure wafers, one disposed on each side of said central wafer;
at least one inlet for inletting at least one reactant etched into at least one of said enclosure wafers;
an inlet penetration of one of said enclosure wafers and in communication with said elongate channel;
an exhaust outlet from said combustion chamber, wherein said channel includes surfaces which inhibit chemical and thermal quenching.

13. The microcombustor as claimed in claim 12, wherein said surfaces are formed from a material chosen using the following approximation for radical trapping probabilities:

$$P_{trap} = 1 - \frac{(1 + m_g/m_s)^2(2kT_g)}{2.4(m_g/m_s)\{2k(T_g - T_s) + w\}}$$

where $T_g$=gas temperature, $T_s$=surface temperature and w=well depth, said coatings being chosen such that w is below approximately 40 kCal/mole.

14. The microcombustor according to claim 12, wherein said surfaces minimize heat transfer.

15. The microcombustor according to claim 12, wherein said central wafer includes side thermal isolation cavities around said surfaces.

16. The microcombustor according to claim 15, wherein said side thermal isolation cavities include a plurality of reflectors surrounded by a plurality of vacuum cavities, such that said combustion chamber is thermally isolated.

* * * * *